(12) United States Patent
Kim et al.

(10) Patent No.: US 11,355,110 B2
(45) Date of Patent: Jun. 7, 2022

(54) ELECTRONIC DEVICE AND METHOD OF PERFORMING FUNCTIONS OF ELECTRONIC DEVICES BY VOICE THEREBETWEEN

(71) Applicant: Samsung Electronics Co., Ltd., Gyeonggi-do (KR)

(72) Inventors: Kyung Tae Kim, Gyeonggi-do (KR); Chang Ho Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/761,443

(22) PCT Filed: Nov. 6, 2018

(86) PCT No.: PCT/KR2018/013389
§ 371 (c)(1),
(2) Date: May 4, 2020

(87) PCT Pub. No.: WO2019/088802
PCT Pub. Date: May 9, 2019

(65) Prior Publication Data
US 2020/0395012 A1    Dec. 17, 2020

(30) Foreign Application Priority Data
Nov. 6, 2017    (KR) .................. 10-2017-0146913

(51) Int. Cl.
*G10L 15/22*    (2006.01)
*G06F 3/16*    (2006.01)
(Continued)

(52) U.S. Cl.
CPC .............. *G10L 15/22* (2013.01); *G06F 3/167* (2013.01); *G10L 15/30* (2013.01);
(Continued)

(58) Field of Classification Search
USPC ..................................... 704/1–504
See application file for complete search history.

(56) References Cited

U.S. PATENT DOCUMENTS 10,073,674 B2 *    9/2018    Stout ................. G06F 3/0481
10,223,710 B2 *    3/2019    Purves ............... G06F 3/011
(Continued)

FOREIGN PATENT DOCUMENTS

KR    1020020048189    6/2002
KR    1020050110173    11/2005
(Continued)

OTHER PUBLICATIONS

PCT/ISA/210 Search Report issued on PCT/KR2018/013389, pp. 5.
(Continued)

*Primary Examiner* — Marcus T Riley
(74) *Attorney, Agent, or Firm* — The Farrell Law Firm, P.C.

(57) ABSTRACT

According to various embodiments of the disclosure, An electronic device according to various embodiments of the disclosure may include: a communication module; a display; a memory; and a processor electrically connected to the communication module, the display, and the memory, wherein the memory stores instructions that cause, when executed, the processor to: receive a voice recognition trigger command during a call while a call connection with an external electronic device is maintained; execute a voice recognition function, based on a voice received from the external electronic device; determine a function execution command corresponding to a recognized voice; and execute a function of the electronic device according to the determined function execution command.

18 Claims, 14 Drawing Sheets

(51) Int. Cl.
*G10L 15/30* (2013.01)
*G06F 3/04817* (2022.01)

(52) U.S. Cl.
CPC .... *G06F 3/04817* (2013.01); *G10L 2015/223* (2013.01); *G10L 2015/228* (2013.01)

(56) References Cited

U.S. PATENT DOCUMENTS

| | | | |
|---|---|---|---|
| 10,540,976 B2* | 1/2020 | Van Os | G10L 15/26 |
| 10,860,100 B2* | 12/2020 | Osterhout | G06F 3/0346 |
| 2008/0097759 A1* | 4/2008 | Shin | G10L 15/26 |
| | | | 704/246 |
| 2010/0009719 A1* | 1/2010 | Oh | H04N 21/42203 |
| | | | 455/563 |
| 2013/0179173 A1 | 7/2013 | Lee et al. | |
| 2017/0110117 A1* | 4/2017 | Chakladar | G10L 15/16 |
| 2017/0206896 A1* | 7/2017 | Ko | G06F 3/167 |
| 2020/0395012 A1* | 12/2020 | Kim | H04M 1/72412 |

FOREIGN PATENT DOCUMENTS

| | | |
|---|---|---|
| KR | 100657059 | 12/2006 |
| KR | 1020080036697 | 4/2008 |
| KR | 1020100007625 | 1/2010 |
| KR | 1020100041501 | 4/2010 |
| KR | 1020120031781 | 4/2012 |
| KR | 1020130082339 | 7/2013 |

OTHER PUBLICATIONS

PCT/ISA/237 Written Opinion issued on PCT/KR2018/013389, pp. 7.
Korea Office Action dated Nov. 25, 2021 issued in counterpart application No. 10-2017-0146913, 10 pages.

* cited by examiner

US 11,355,110 B2

ELECTRONIC DEVICE AND METHOD OF PERFORMING FUNCTIONS OF ELECTRONIC DEVICES BY VOICE THEREBETWEEN

PRIORITY

This application is a National Phase Entry of PCT International Application No. PCT/KR2018/013389 which was filed on Nov. 6, 2018, and claims priority to Korean Patent Application No. 10-2017-0146913, which was filed on Nov. 6, 2017, the content of each of which is incorporated herein by reference.

BACKGROUND

1. Field

The disclosure relates to an electronic device and a method of performing functions by voice between electronic devices during a call.

2. Related Art

Voice recognition technology may be implemented in various electronic devices equipped with a voice input device (e.g., a microphone). Recently, the voice recognition technology has replaced physical input in the electronic devices, and has been widely used in order to control electronic devices by voice.

Voice recognition technology implemented in the electronic device may make it difficult to utilize the voice recognition technology implemented in an external electronic device.

According to various embodiments of the disclosure, the electronic device may activate a voice recognition function during a call, thereby operating the voice recognition function by a voice received from an external electronic device.

According to various embodiments of the disclosure, the electronic device may execute a voice recognition function installed in an external electronic device in a call.

SUMMARY

An electronic device according to various embodiments of the disclosure may include: a communication module; a display; a memory; and a processor electrically connected to the communication module, the display, and the memory, wherein the memory stores instructions that cause, when executed, the processor to: receive a voice recognition trigger command during a call while a call connection with an external electronic device is maintained; execute a voice recognition function, based on a voice received from the external electronic device; determine a function execution command corresponding to a recognized voice; and execute a function of the electronic device according to the determined function execution command.

An electronic device according to various embodiments of the disclosure may receive a voice recognition trigger command during a call while a call connection with an external electronic device is maintained, may execute a voice recognition function by means of a voice received from the external electronic device after the trigger command, may determine a function execution command corresponding to the recognized voice, and may execute a function of the electronic device according to the determined function execution command during the call.

According to various embodiments of the disclosure, the electronic device may activate a voice recognition function of an external electronic device, based on user authentication in the state of a call connection with the external electronic device, thereby controlling the external electronic device by voice.

According to various embodiments of the disclosure, the electronic device may perform voice recognition using voice data received from an external electronic device in the state of a call connection with the external electronic device, thereby executing a function corresponding to the recognized voice command.

DETAILED DESCRIPTION

Figure 1:
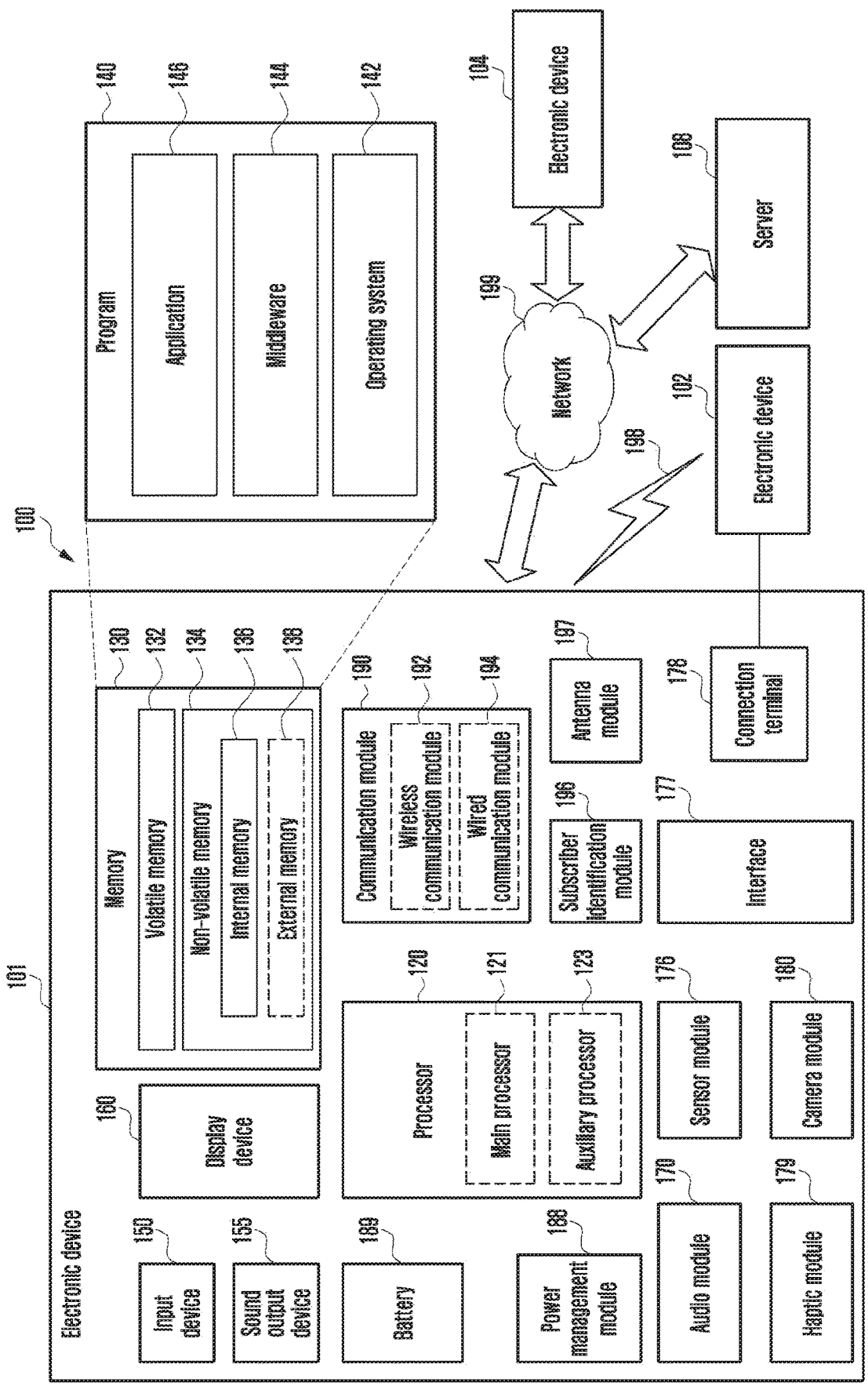
FIG. 1 is a block diagram illustrating an electronic device 101 in a network environment 100 according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

According to an embodiment, the wireless communication module 192 may identify and authenticate the electronic device 101 in a communication network, using subscriber information (e.g., international mobile subscriber identity (IMSI)) stored in the subscriber identification module 196.

The antenna module 197 may include at least one antenna for transmitting or receiving a signal or power to or from the outside (e.g., the external electronic device) of the electronic device 101. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
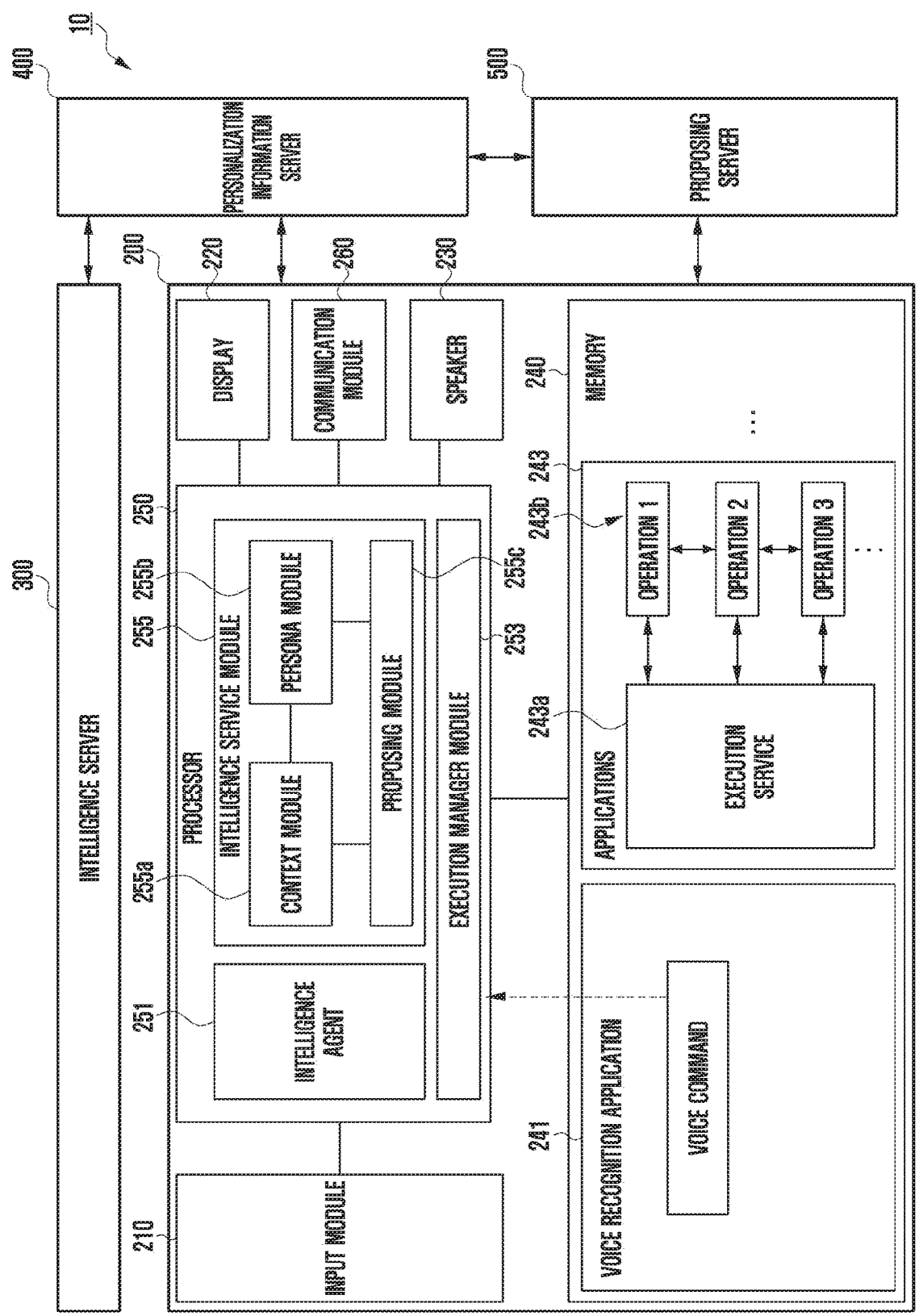
FIG. 2 is a block diagram illustrating an electronic device of a voice recognition system according to an embodiment of the disclosure.

FIG. 2 is a block diagram illustrating an electronic device of a voice recognition system according to an embodiment of the disclosure.

Referring to FIG. 2, an electronic device 200 (e.g., the electronic device 101 in FIG. 1) may include an input module 210 (e.g., the input device 150 in FIG. 1), a display 220 (e.g., the display device 160 in FIG. 1), a speaker 230 (e.g., the sound output device 155 in FIG. 1), a memory 240 (e.g., the memory 130 in FIG. 1), a communication module 260 (e.g., the communication module 190 in FIG. 1), or a processor 250 (e.g., the processor 120 in FIG. 1). The electronic device 200 may further include a housing, and the components of the electronic device 200 may be mounted inside the housing, or may be located on the housing.

According to an embodiment, the input module 210 may receive a user input from a user. For example, the input module 210 may receive a user input from an external device (e.g., a keyboard or a headset) connected thereto. As another example, the input module 210 may include a touch screen (e.g., a touch screen display) coupled to the display 220. As another example, the input module 210 may include hardware keys (e.g., 212 in FIG. 3) (or physical keys) located in the electronic device 200 (or the housing of the electronic device 200).

According to an embodiment, the input module 210 may include a microphone (e.g., 211 in FIG. 2) capable of receiving a voice signal of a user's speech. For example, the input module 210 may include a speech input system, and may receive a voice signal of a user's speech through the speech input system.

According to an embodiment, the display 220 may display images, videos, and/or execution screens of applications. For example, the display 220 may display a graphical user interface (GUI) of an application.

According to an embodiment, the speaker 230 may output voice signals. For example, the speaker 230 may output a voice signal produced inside the electronic device 200 to the outside.

According to an embodiment, the memory 240 may store data associated with a plurality of applications 241 and 243 including a voice recognition application and second applications. For example, the plurality of applications 241 and 243 stored in the memory 240 may be selected, executed, and operated according to a user input.

According to an embodiment, the memory 240 may include a database capable of storing information required to recognize a user input. For example, the memory 240 may include a log database capable of storing log information. As another example, the memory 240 may include a persona database capable of storing user information.

According to an embodiment, the memory 240 may store at least one application (e.g., the voice recognition application 241), and the at least one application 241 or 243 may be loaded and operated in a volatile memory. For example, at least one application 241 or 243 stored in the memory 240 may be loaded into a volatile memory by an execution manager module 253 of the processor 250, and may be operated therein. The at least one application 241 or 243 may include, for example, an execution service 243a for executing a function or a plurality of operations (or unit operations) 243b. For example, the execution service 243a may be produced by the execution manager module 253 of the processor 250, and may perform a plurality of operations 243b.

According to an embodiment, when the operation 243b of the application 241 or 243 is executed, an execution state screen as a result of the execution of the operation 243b may be displayed on the display 220. For example, the execution state screen may be a screen showing the state in which the operation 243b is completed. As another example, the execution state screen may be a screen showing the state in which the execution of the operation 243b is stopped (partial landing) (for example, the case where a parameter necessary for the operation 243b is not input).

According to an embodiment, the execution service 243a may execute the operations 243b according to a path rule. For example, the execution service 243a may be activated by the execution manager module 253, may receive an execution request from the execution manager module 253 according to a path rule, and may perform the operations 243b of the operations 241 and 243 according to the execution request. If the execution of the operation 243b is completed, the execution service 243a may transmit completion information to the execution manager module 253.

According to an embodiment, when the plurality of operations 243b are executed in the applications 241 and 243, the plurality of operations 243b may be sequentially executed. When the execution of one operation (operation 1) is completed, the execution service 243a may open a subsequent operation (operation 2), and may transmit completion information of operation 1 to the execution manager module 253. Opening an operation may be understood, for example, as switching the operation to an executable state or as preparing to execute the operation. For example, if a certain operation is not opened, the corresponding operation cannot be executed.

According to an embodiment, if the completion information is received, the execution manager module 253 may transmit a request for executing a subsequent operation (e.g., operation 2) to the execution service 243a. According to an embodiment, in the case where the plurality of applications 141 and 243 is executed, the plurality of applications 241 and 243 may be sequentially executed. For example, if completion information is received from the execution service according to completion of a first application or the last operation of the voice recognition application 241, the execution manager module 253 may transmit a request for performing a first operation of another application 243 to the service 243a.

According to an embodiment, in the case where the plurality of operations 243b is executed in the applications 241 and 243, the screens as a result of the execution of the plurality of operations 243b may be displayed on the display 220. According to an embodiment, only some of a plurality of screens as a result of the execution of the plurality of operations 243b may be displayed on the display 220.

According to an embodiment, the memory 240 may store intelligence applications (e.g., the voice recognition application 241) associated with an intelligence agent 251. The voice recognition application 241 associated with the intelligence agent 251 may receive and process, for example, a voice signal of a user's speech. According to an embodiment, the voice recognition application associated with the intelligence agent 251 may be operated by a specific input through the input module 210 (e.g., an input through a hardware key, an input through a touch screen, or a specific voice input).

According to an embodiment, the processor 250 may control the overall operation of the electronic device 200. For example, the processor 250 may control the input module 210 so as to receive a user input. The processor 250 may control the display 220 so as to display images. The processor 250 may control the speaker 230 so as to output a voice signal. The processor 250 may control the memory 240 so as to retrieve or store necessary information.

According to an embodiment, the processor 250 may include an intelligence agent 251, an execution manager module 253, or an intelligence service module 255. In an embodiment, the processor 250 may execute instructions stored in the memory 240, thereby activating the intelligence agent 251, the execution manager module 253, or the intelligence service module 255. Various modules mentioned in various embodiments of the disclosure may be implemented in hardware or in software. In various embodiments of the disclosure, the operation performed by the intelligence agent 251, the execution manager module 253, or the intelligence service module 255 may be understood as the operation performed by the processor 250.

According to an embodiment, the intelligence agent 251 may produce a command to execute the application, based on a received voice signal. According to an embodiment, the execution manager module 253 may receive the produced command from the intelligence agent 251, and may select, execute, and operate the applications 241 and 243 stored in the memory 240. According to an embodiment, the intelligence service module 255 may manage user information, and may use the same to process user input. The intelligence agent 251 may transmit a user input received through the input module 210 to the intelligence server thereby processing the same therein.

According to an embodiment, the intelligence agent 251 may preprocess the user input before transmitting the user input to the intelligence server 200. According to an embodiment, the intelligence agent 251 may include an adaptive echo canceller (AEC) module, a noise suppression (NS) module, an end-point detection (EPD) module, or an automatic gain control (AGC) module in order to preprocess the user input. The adaptive echo canceller module may cancel an echo included in the user input. The noise suppression module may suppress background noise included in the user input. The end-point detection module may detect an end point of a user's voice included in the user input to find a user voice part. The automatic gain control module may adjust the volume of the user input to be suitable for recognizing and processing the user input. According to an embodiment, although the intelligence agent 251 may include all of the preprocessing configurations for performance, the intelligence agent 251 may include some of the preprocessing configurations in order to operate at low power in another embodiment.

According to an embodiment, the intelligence agent 251 may include a wake-up recognition module for recognizing a user call. The wake-up recognition module may perform a function of recognizing a wake-up command of the user through, for example, a voice recognition module (or a voice recognition application). If the wake-up command is recognized, the intelligence agent 251 may be activated to receive a user input. According to an embodiment, the wake-up recognition module of the intelligence agent 251 may be implemented in a low-power processor (e.g., a processor included in an audio codec). According to an embodiment, the intelligence agent 251 may be activated according to an input through a hardware key. If the intelligence agent 251 is activated, the voice recognition application 241 associated with the intelligence agent 251 may be executed.

According to an embodiment, the intelligence agent 251 may include a voice recognition module for recognizing an input. The voice recognition module may recognize an input for performing a voice recognition function using, for example, the voice recognition application 241, thereby performing an operation. For example, the voice recognition module may recognize the wake-up command or limited user voice inputs for performing operations (e.g., a speech such as "click" for performing a photographing operation while a camera application is running) in the voice recognition application 241. The voice recognition module for recognizing a user input by assisting the intelligence server 300 may recognize and quickly process, for example, a user command that may be processed in the electronic device 200. According to an embodiment, the voice recognition module for recognizing a user input in the intelligence agent 251 may be implemented in an application processor.

According to an embodiment, the voice recognition module of the intelligence agent 251 (including a voice recognition module in the wake-up recognition module) may recognize a user input using an algorithm for recognizing voice. The algorithm used to recognize voice may be at least one of a HMM (hidden markov model) algorithm, an ANN (artificial neural network) algorithm, or a DTW (dynamic time warping) algorithm.

According to an embodiment, the intelligence agent 251 may convert a user voice input into text data. According to an embodiment, the intelligence agent 251 may transmit a user voice to the intelligence server 300, thereby receiving converted text data. The intelligence agent 251 may, for example, display the text data on the display 220.

According to an embodiment, the intelligence agent 251 may receive a path rule from the intelligence server 300. According to an embodiment, the intelligence agent 251 may, transmit a path rule to the execution manager module 253.

According to an embodiment, the intelligence agent 251 may transmit an execution result log according to the path rule received from the intelligence server 300 to the intelligence service module 255, and the transmitted execution result log may be accumulated and managed in preference information of a user in a persona manager 255h.

According to an embodiment, the execution manager module 253 may receive a path rule from the intelligence agent 251 to execute the applications 241 and 243 such that the applications 241 and 243 perform the operations 243b included in the path rule. For example, the execution manager module 253 may transmit command information for performing the operations 243b to the applications 241 and 243, and may receive completion information on the operations 243b from the applications 241 and 243.

According to an embodiment, the execution manager module 253 may transmit and receive command information for performing the operations 243b of the application 241 and 243 between the intelligence agent 251 and the applications 241 and 243. The execution manager module 253 may bind the applications 241 and 243 to be executed according to the path rule, and may transmit command information on the operations 243b included in the path rule to the applications 241 and 243. For example, the execution manager module 253 may sequentially transmit the operations 243b included in the path rule to the applications 241 and 243, thereby executing the operations 243b of the applications 241 and 243 in sequence according to the path rule.

According to an embodiment, the execution manager module 253 may manage the execution states of the operations 243b of the applications 241 and 243. For example, the execution manager module 253 may receive information about the execution states of the operations 243b from the applications 241 and 243. For example, if the execution state of the operation 243b is a stoppage state (partial landing) (for example, in the case where a parameter necessary for the operation 243b is not input), the execution manager module 253 may transmit information on the stoppage state to the intelligence agent 251. The intelligence agent 251 may makes a request to a user for inputting necessary information (e.g., parameter information) using the received information. As another example, if the execution state of the operation 243b is an operation state, the intelligence agent 251 may receive a speech from the user, and the execution manager module 253 may transmit information on the executed application 241 or 243 and information on the execution state of the application 241 or 243 to the intelligence agent 251. The intelligence agent 251 may receive information on the parameter of the user's speech through the intelligence server 200, and may transmit the received parameter information to the execution manager module 253. The execution manager module 253 may change the parameters of the operations 243b to new parameters using the received parameter information.

According to an embodiment, the execution manager module 253 may transmit parameter information included in the path rule to the applications 241 and 243. In the case where a plurality of applications 241 and 243 is sequentially executed according to the path rule, the execution manager module 253 may transmit the parameter information included in the path rule from one application to another application.

According to an embodiment, the execution manager module 253 may receive a plurality of path rules selected based on a user's speech. For example, if the user's speech specifies some applications for performing some operations (e.g., the voice recognition application 241) but does not specify other applications 243 for performing the remaining operations, the execution manager module 253 may receive a plurality of different path rules in which the same application for performing some applications (e.g., a gallery application) is executed and different applications 243 for performing the remaining operations (e.g., a message application and a telegram application) are executed. The execution manager module 253 may perform, for example, the same operation (e.g., consecutive operations 243b that are identical to each other) of the plurality of path rules. When the same operation is performed, the execution manager module 253 may display, on the display 220, a state screen for selecting the different applications 241 and 243 included in the plurality of path rules.

According to an embodiment, the intelligence service module 255 may include a context module 255*a*, a persona manager 255*b*, or a proposing module 255*c*.

According to an embodiment, the context module 255*a* may collect the current states of the applications 241 and 243 from the applications 241 and 243. For example, the context module 255*a* may receive context information indicating the current states of the applications 241 and 243, thereby collecting the current states of the applications 241 and 243.

According to an embodiment, the persona manager 255*b* may manage personal information of the user using the electronic device 200. For example, the persona manager 255*b* may manage personal information of the user by collecting usage information and execution results of the electronic device 200.

According to an embodiment, the proposing module 255*c* may predict the user's intention, and may recommend commands to the user. For example, the proposing module 255*c* may recommend commands to the user in consideration of the current state of the user (e.g., time, place, situation, or application).

An electronic device (e.g., the electronic device 101 in FIG. 1 or the electronic device 200 in FIG. 2) according to various embodiments of the disclosure may include: a communication module (e.g., the communication module 190 in FIG. 1 or the communication module 260 in FIG. 2); a display (e.g., the display 160 in FIG. 1 or the display 220 in FIG. 2); a memory (e.g., the memory 130 in FIG. 1 or the memory 240 in FIG. 2); and a processor (e.g., the processor 120 in FIG. 1 or the processor 250 in FIG. 2) electrically connected to the communication module 190 or 260, the display 160 or 220, and the memory 130 or 240, wherein the memory 130 or 240 may store instructions that enable to receive a voice recognition trigger command during a call while a call connection with an external electronic device is maintained, activate a voice recognition function, based on the trigger command thereafter, execute the voice recognition function, based on the received voice, determine a function execution command corresponding to a recognized voice, and execute a function of the electronic device according to the determined function execution command.

In the case where the processor 120 or 250 activates the voice recognition function during the call, the processor 120 or 250 may switch to a voice recognition mode during the call in which the voice recognition function is executed by means of voice data received from the external electronic device through a call connection channel while ignoring the voice data received from a microphone.

If an input signal of a key configured to activate the voice recognition function is received from the external electronic device, the processor 120 or 250 may recognize the input signal as a trigger command, thereby activating the voice recognition function, and may execute the voice recognition function by means of the voice received while the reception of the key input signal from the external electronic device is maintained.

If an input signal of a key configured to activate the voice recognition function is received from the external electronic device, the processor 120 or 250 may recognize the input signal as a trigger command, thereby activating the voice recognition function, may execute the voice recognition function, based on the voice received from the external electronic device after receiving the key input signal, and if the key input signal is received again, may terminate the voice recognition mode during the call.

The processor 120 or 250 may determine whether or not the external electronic device has voice control authority, and if the external electronic device has voice control authority, may activate the voice recognition function, and if the external electronic device has no voice control authority, may not activate the voice recognition function.

The processor 120 or 250 may output, to the display 160 of 220, a call screen including an authorization icon for remotely grating voice control authority to the external electronic device when a call is connected, and if an input for selecting the authorization icon is received through the call screen, may grant the voice control authority to the external electronic device, thereby activating the voice recognition function and switching to the voice recognition mode during the call.

The processor 120 or 250 may connect a call in the state in which the voice recognition function is activated, may monitor a voice received from the external electronic device, thereby recognizing a speech time of the voice corresponding to a trigger command, if the speech time is recognized, may determine whether or not the external electronic device has voice control authority, and if the external electronic device has voice control authority, may execute a voice recognition function by means of the voice received from the external electronic device after the speech time.

The processor 120 or 250 may determine whether or not the external electronic device has voice control authority if the call is connected, and if the external electronic device has voice control authority, may activate a voice recognition function and switch to the voice recognition mode during the call.

The external electronic device having the voice control authority may be a device included in a family group among contact lists stored in the electronic device or a device registered as being capable of voice control during the call.

The processor 120 or 250 may output an operation screen corresponding to the operation of executing at least one determined function to the display 160 or 220.

The processor 120 or 250 may output a user interface for a user input required when the at least one function is executed to the display 160 or 220, and may execute the function, based on the user input.

The processor 120 or 250 may transmit information on the operation screen displayed on the display 160 or 220 to the external electronic device.

The processor 120 or 250 may control the communication module 190 or 260 so as to transmit and receive voice data to and from the external electronic device through a first communication channel and so as to transmit and receive at least one of a trigger key input signal or operation screen information to and from the external electronic device through a second communication channel.

The processor 120 or 250 may provide the external electronic device with feedback information indicating that the execution of the function of the electronic device is completed in the case where the execution of the function of the electronic device is completed in response to the voice received from the external electronic device.

Hereinafter, although an electronic device and an external electronic device will be separately described hereinafter in an embodiment of the disclosure for the convenience of explanation, the electronic device and the external electronic device may include various terminal devices (or electronic devices) capable of accessing the Internet, such as mobile phones, smartphones, PDAs (personal digital assistants), notebook computers, or the like. In the embodiment of the disclosure, the electronic device may be understood as a controlee device that is remotely controlled by an external electronic device, and the external electronic device may be understood as a controller device that remotely controls the electronic device. Hereinafter, for the convenience of explanation, the electronic device will be explained as the subject of operation, but the operation of the electronic device may be performed under the control of a processor of the electronic device. In addition, the external electronic device may perform all operations performed in the electronic device.

Figure 3:
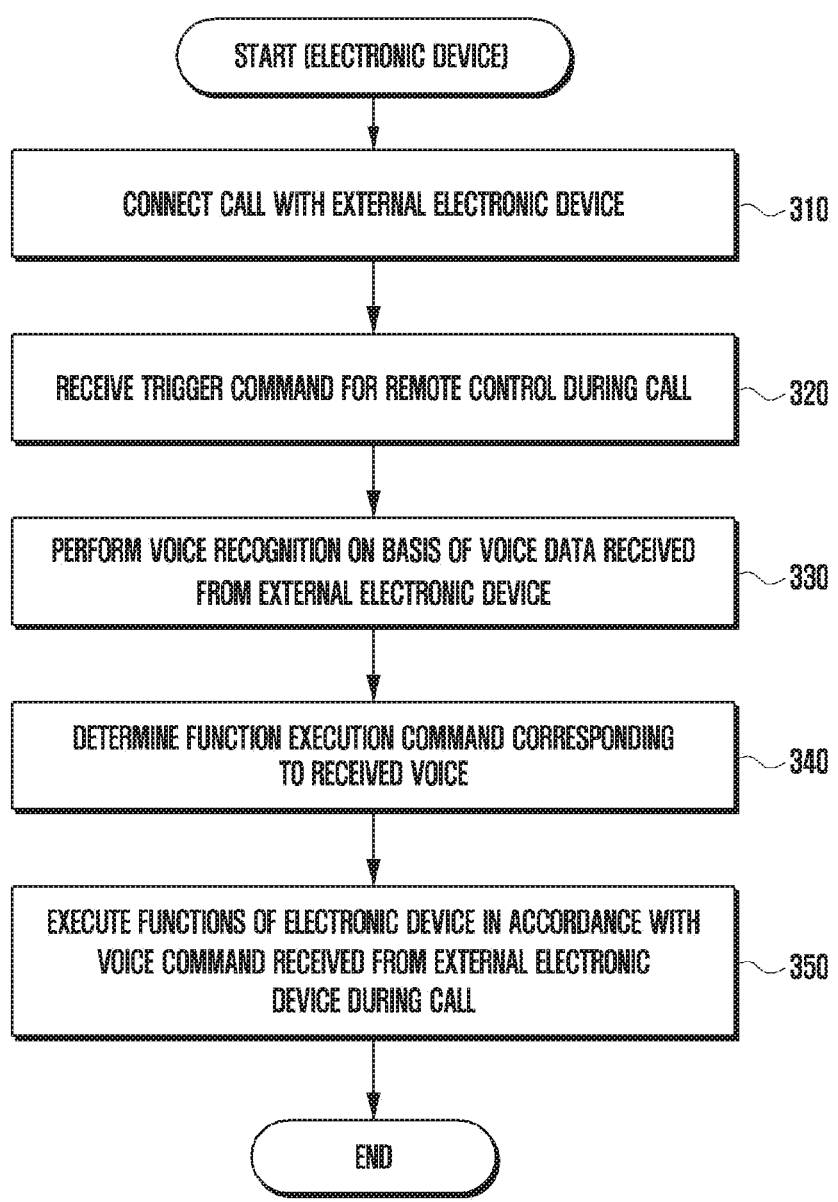
FIG. 3 illustrates a method of executing functions by voice between electronic devices according to an embodiment of the disclosure.

FIG. 3 illustrates a method of executing functions by voice between electronic devices according to an embodiment of the disclosure.

Referring to FIG. 3, an electronic device according to various embodiments (e.g., the electronic device 200 in FIG. 2) may be connected to an external electronic device for a call through a communication module (e.g., the communication module 260 in FIG. 2) in operation 310. For example, the electronic device may establish a communication channel with the external electronic device by receiving a response signal to a call request of the electronic device or by accepting a call connection request of the external electronic device through at least one base station.

In operation 320, the electronic device may receive a trigger command authenticated (or configured) for a voice recognition function during a call in a call connection state with the external electronic device. For example, the authenticated trigger command may be at least one of a trigger voice for triggering a voice recognition function (e.g., "Bixby", "voice recognition wake up", etc.), among voice data received from the external electronic device having voice control authority, or an input signal of a trigger key (e.g., a hard key or a soft key) for activating a voice recognition function.

According to an embodiment, if the electronic device receives an input signal of a trigger key for activating a voice recognition function from the external electronic device during a call, or if the electronic device receives a signal for selecting a trigger key configured to grant voice control authority to the external electronic device during a call, the electronic device may recognize the signal as a trigger command, thereby switching to a "voice recognition mode during a call".

According to an embodiment, the voice recognition mode during a call may be the mode in which the voice recognition function is executed based on the voice data received from the external electronic device while ignoring the voice data received from the microphone of the electronic device.

According to an embodiment, in the case of switching to the voice recognition mode during a call according to the reception of the input signal of the trigger key, the electronic device may recognize a voice command, based on the voice received from the external electronic device after the input signal of the trigger key is received. As another example, in the case of switching to the voice recognition mode during a call according to the reception of the input signal of the trigger key, the electronic device may recognize a voice command, only based on the voice received from the external electronic device, while the reception of the input signal of the trigger key is maintained. As another example, the electronic device may execute a voice recognition function, only based on the voice data received from the external electronic device, from the reception of an input signal of the trigger key to the reception of another input signal of the trigger key. As another example, if an input signal of the trigger key is received again after receiving the input signal of the trigger key, the electronic device may terminate the voice recognition mode during a call.

For example, the input signal of the trigger key may be received from the external electronic device using at least one of a communication channel (e.g., CS (circuit switching) network communication) providing a voice call service or a communication channel (e.g., PS (packet switching) network communication) providing a data transmission/reception service to the external electronic device.

According to another embodiment, the electronic device may determine whether or not the external electronic device has voice control authority when a call is connected, and if the external electronic device is determined to have voice control authority, the electronic device may switch to a voice recognition mode during a call. The external electronic device having the voice control authority may be at least one of, for example, the device included in the family group among contact lists stored in the electronic device or the device registered as being capable of giving a voice command during a call.

According to an embodiment, the electronic device may monitor whether or not a trigger voice for voice control is received from the external electronic device in response to a result of determining whether or not the external electronic device has voice control authority. For example, the electronic device may monitor the trigger voice, and may collect voices received from the external electronic device for voice recognition after the trigger voice.

In operation 330, the electronic device may activate a voice recognition function, based on the reception of the trigger command, and may perform voice recognition, based on the voice data received from the external electronic device after the trigger command.

In operation 340, the electronic device may determine a function execution command corresponding to the voice received from the external electronic device.

In operation 350, the electronic device may execute a function of the electronic device according to the function execution command corresponding to the voice received from the external electronic device.

According to an embodiment, the electronic device may change the voice data received from the external electronic device through a communication network into text data while ignoring the voice data received through a microphone in the voice recognition mode during the call. The electronic device may produce a function execution command (or a path rule) for performing a function, based on the changed text data. For example, the function execution command may include information about the action (or operation) for executing a function of an application or information about a parameter required to perform the operation. As another example, the function execution command may include the operation of an application for performing a specific function (hereinafter, referred to as an "application") or application program. The electronic device may select an application (or an application program) according to the produced function execution command, and may perform the operation included in the function execution command using the selected application.

According to various embodiments, the electronic device may display, on the display, an operation screen to correspond to the function execution operation according to the function execution command. For example, the electronic device may execute at least one operation according to the execution of a function, and may display results of performing all of at least one operation or only a result of performing the last operation thereof on the display.

According to various embodiments, the electronic device may transmit an operation screen corresponding to the function execution operation to the external electronic device. For example, the external electronic device may identify the function execution operation performed in the electronic device.

According to another embodiment, the electronic device may not display the operation screen on the display to correspond to the function execution operation. For example, if the execution of a function according to the function execution command or the path rule is completed, the electronic device may provide the display with information indicating that the execution of a function is complete, or may output the same by sound.

Figure 4:
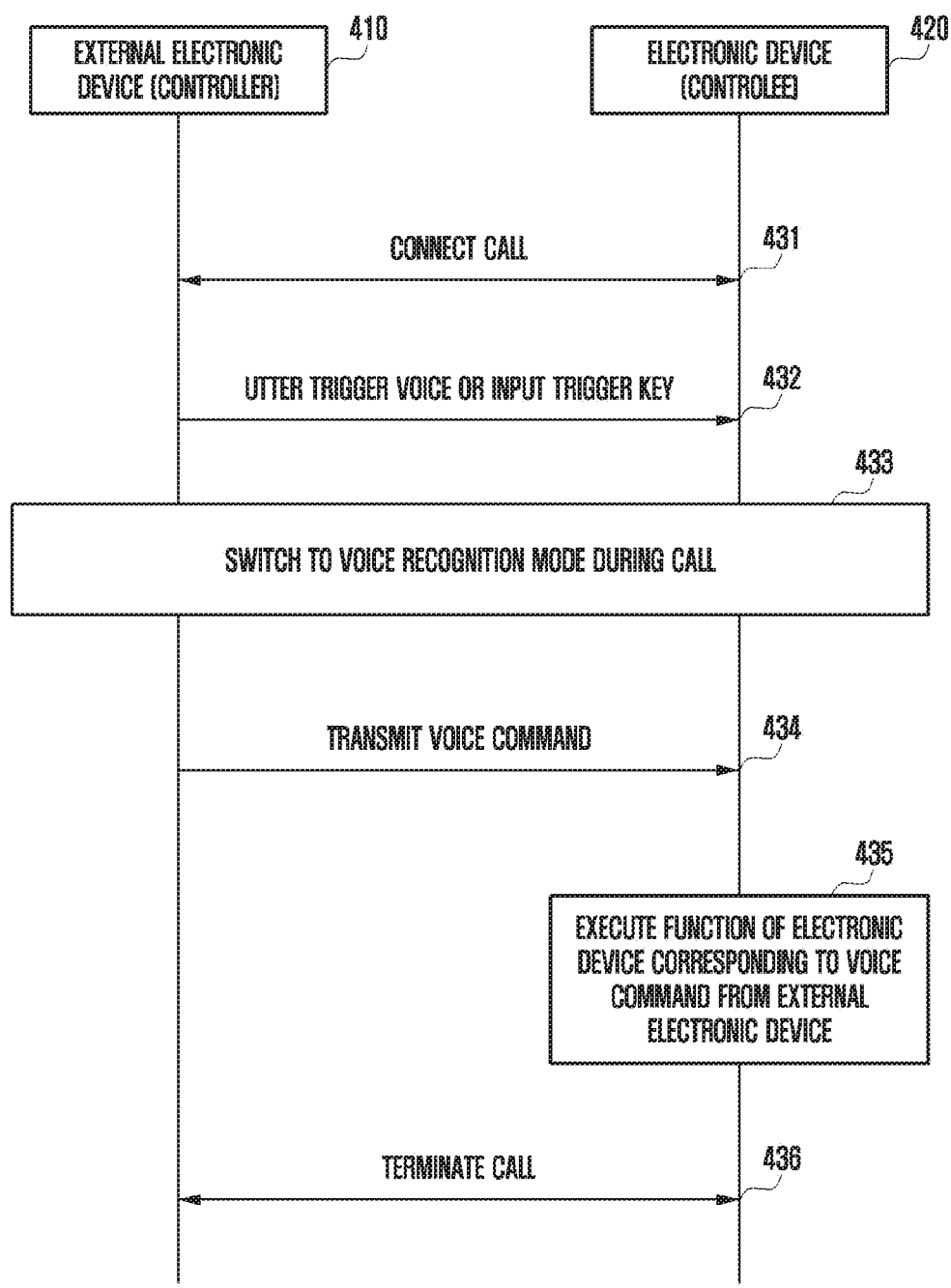
FIG. 4 illustrates a method of executing functions by voice between electronic devices according to an embodiment of the disclosure.

FIG. 4 illustrates a method of executing functions by voice between electronic devices according to an embodiment of the disclosure.

Referring to FIG. 4, according to various embodiments, an external electronic device 410 (e.g., the electronic device 200 in FIG. 2) and an electronic device 420 (e.g., the electronic device 200 in FIG. 2) may be connected to each other for a call in operation 431. According to an embodiment, the external electronic device 410 and the electronic device 420 may operate in the state capable of recognizing a trigger voice.

In operation 432, in order to switch to a "voice recognition mode during a call", the external electronic device 410 may transmit a trigger voice to the electronic device 420, or may transmit a signal of an input (e.g., pressing) onto the trigger key to the electronic device 420.

In operation 433, the electronic device 420 may switch to a "voice recognition mode during a call", in which the voice recognition function is controlled by the voice from the external electronic device 410, at the time at which a trigger voice, among the voices received from the external electronic device 410, occurs or at the time at which the input signal of the trigger key is received while the call connection is maintained.

In an embodiment, the electronic device 420 may further perform operations of determining whether or not the external electronic device 410 has voice control authority at the time at which the trigger voice occurs, if it is determined that the external electronic device 410 has voice control authority, switching to a "voice recognition mode during a call", and if it is determined that the external electronic device 410 has no voice control authority, not switching to a "voice recognition mode during a call". For example, if it is determined that the external electronic device 410 has no voice control authority even if a trigger command is received from the external electronic device 410 in the call state, the electronic device 420 may ignore the voice received from the external electronic device 410.

According to an embodiment, both the electronic device 420 and the external electronic device 410 may switch to the a voice recognition mode during a call to execute a voice recognition function, only based on the voice data received through a communication channel, while ignoring the voice data received from a microphone. For example, even if a speech of a trigger voice "Bixby" is detected from a microphone during a call, the external electronic device 410 may restrict the voice recognition function for the voice received from the microphone because the external electronic device 410 is in the call connection state and is in the voice recognition mode during a call. For example, the external electronic device 410 may be used to transmit merely the voice data received from the microphone only to the electronic device 420 even if a speech of a trigger voice occurs during the call with the electronic device 420. As a result, the voice recognition function of the external electronic device 410 may be limited.

In operation 434, the external electronic device 410 may transmit, to the electronic device 420, a voice command input through the microphone to request a function to be performed in the electronic device 420.

In operation 435, the electronic device 420 may determine a voice command, based on the voice received from the external electronic device 410, and may execute the function of the electronic device 420 corresponding to the voice command.

In operation 436, the external electronic device 410 and the electronic device 420 may terminate the call therebetween.

Figure 5:
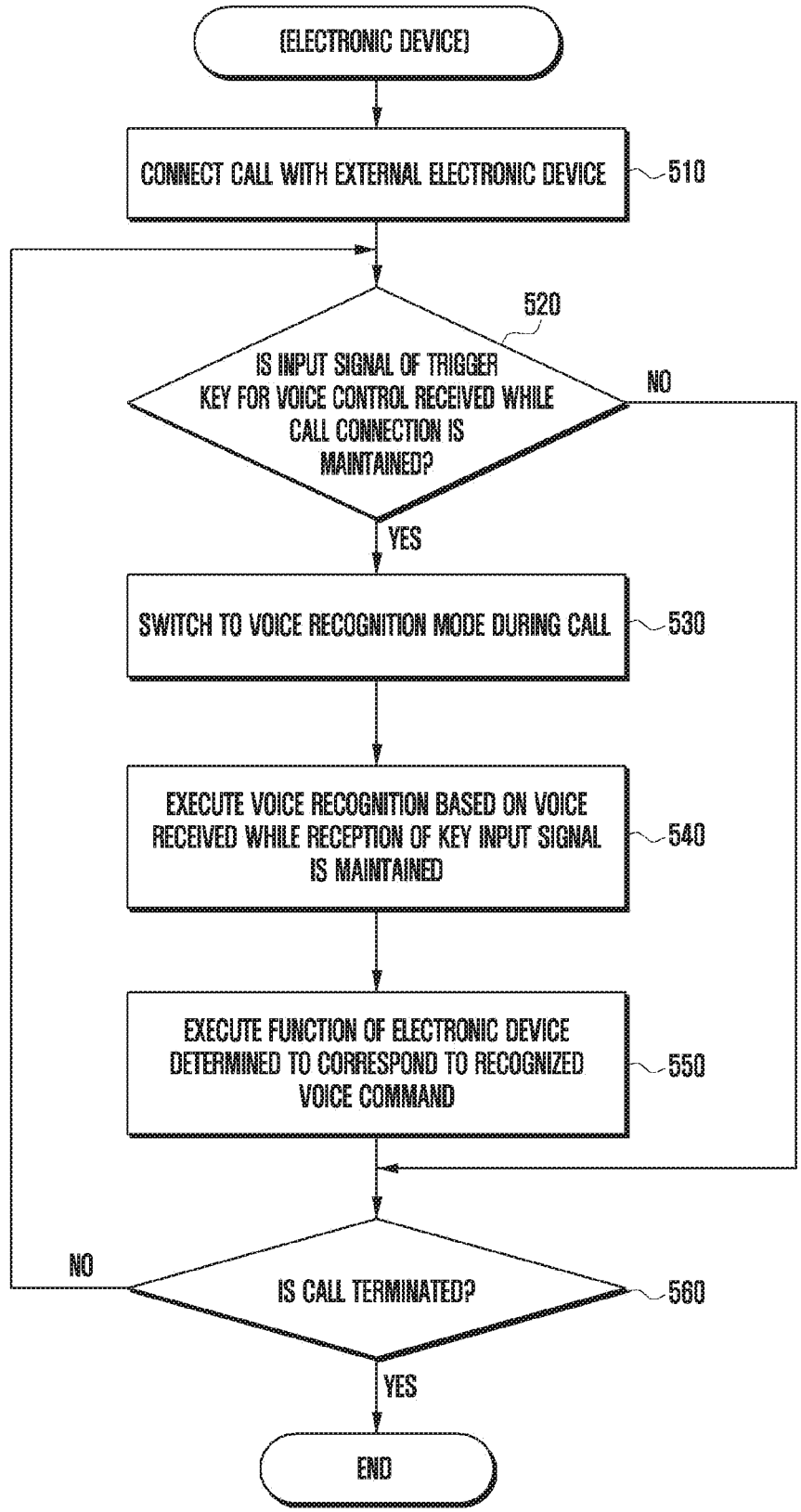
FIG. 5 illustrates a method of executing functions by voice between electronic devices according to an embodiment of the disclosure.
Figure 6:
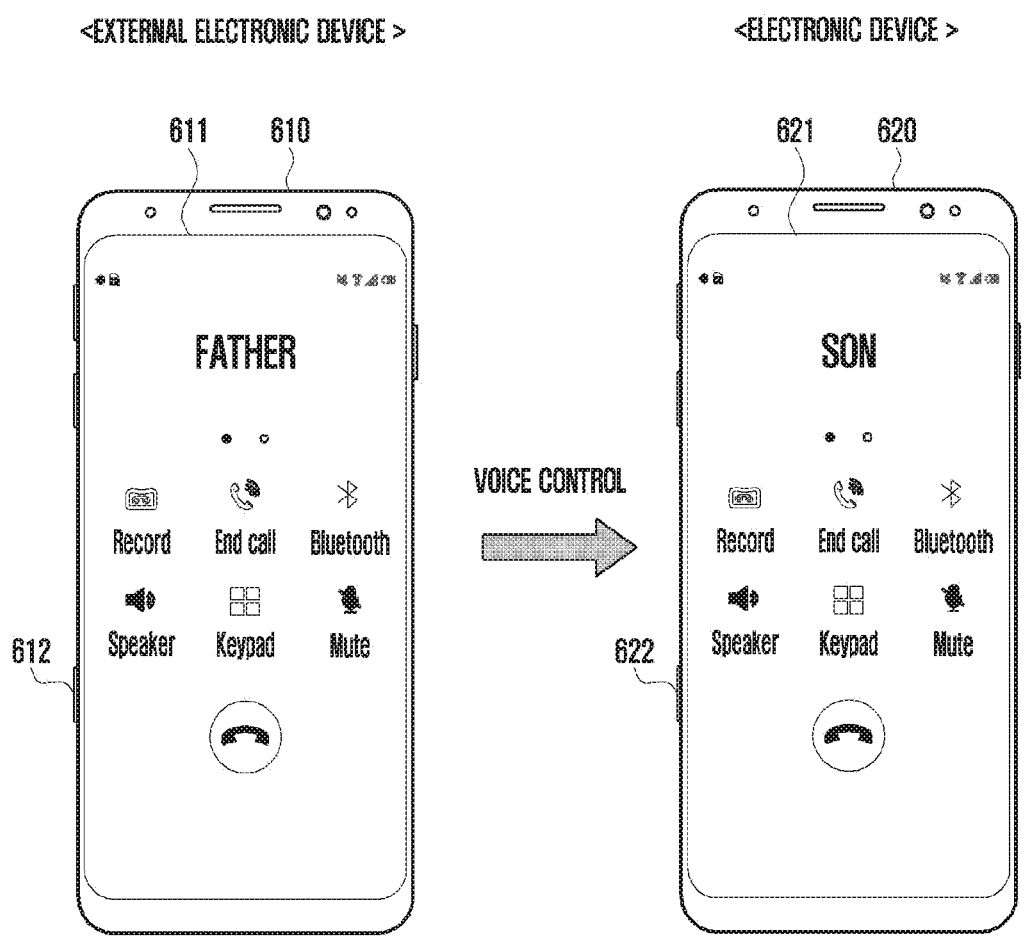
FIG. 6 illustrates an example of executing functions by voice during a call between electronic devices according to an embodiment of the disclosure.

FIG. 5 illustrates a method of executing functions by voice between electronic devices according to an embodiment of the disclosure. FIG. 6 illustrates an example of executing functions by voice during a call between electronic devices according to an embodiment of the disclosure.

Referring to FIGS. 5 and 6, an electronic device (e.g., the electronic device 200 in FIG. 2 of the electronic device 620 in FIG. 6) according to various embodiments may be connected to an external electronic device (e.g., the electronic device 200 in FIG. 2 or the external electronic device 610 in FIG. 6) for a call through a communication module (e.g., the communication module 260 in FIG. 2) in operation 510.

In operation 520, the electronic device 620 may determine whether or not an input signal of a trigger key (e.g., a hardware key) for voice control or activation of a voice recognition function is received from the external electronic device while the call connection is maintained.

According to various embodiments, as shown in FIG. 6, the external electronic device 610 or the electronic device 620 may include a hardware key 612 or 622 for activating a voice recognition function. As another example, although not shown in the drawing, the external electronic device 610 or the electronic device 620 may include a microphone capable of receiving a user's speech as a voice signal. The external electronic device 610 or the electronic device 620 may execute a voice recognition function (or an application) through, for example, the hardware key 612 or 622.

According to an embodiment, the hardware keys 612 and 622 may be used as trigger keys for remotely controlling the external electronic device by voice in the call state.

In operation 530, if an input signal of the configured trigger key (e.g., the hardware key 612 in FIG. 6) is received from the external electronic device 610 while the call connection is maintained, the electronic device 620 may switch to a "voice recognition mode during a call". The voice recognition mode during a call may be understood as the mode in which the voice recognition function is executed based on the voice received from the external electronic device through a communication channel while ignoring the voice received from the microphone.

In operation 540, the electronic device 620 may execute voice recognition, only based on the voice received from the external electronic device 610, while the call connection is maintained and while an input signal of the trigger key is received from the external electronic device 610. For example, the electronic device 620 may identify the voice data received from the external electronic device 610 from the time at which the input signal of the trigger key is received to the time at which the input signal of the trigger key is no longer received, and may execute a voice recognition function, based on the identified voice data.

In an embodiment, as shown in FIG. 6, in the case where the electronic device 620 is a father device and the external electronic device 610 is a son device, the son device and the father device may be in a call connection state, and may output call screens 611 and 621, respectively. During the call between the father and the son, if the father finds it difficult to execute a function on the father device (e.g., the electronic device 620), the son may utter a voice for controlling the function of the father device while pressing and holding the hardware key 612 configured as a trigger key of the son device (e.g., the external electronic device 610) in the call connection state. For example, the son may say "Bixby, open the Internet browser, access the Korail.com site, and book one ticket for Mugunghwa from Seoul destined for Busan at 7 o'clock evening" while pressing and holding the hardware key 612 of the son device (e.g., the external electronic device 610) during the call with his father. The son device may provide the father device with the voice data corresponding to the son's speech at the same time as the input signal of the hardware key 622.

In operation 540, the electronic device 620 may perform voice recognition, based on the voice data received from the external electronic device 610 while the reception of the key input signal is maintained.

In operation 550, the electronic device 620 may execute the function of the electronic device determined to correspond to the voice command received from the external electronic device 610.

In operation 560, the electronic device 620 may determine whether or not the call is terminated, and if the call is terminated, the electronic device 620 may terminate the process. Otherwise, the electronic device 620 may return to step 520.

According to an embodiment, if the electronic device 620 switches to the voice recognition mode during a call, the external electronic device 610 may also switch to the voice recognition mode during a call, and may restrict the execution of a voice recognition function that may be executed in the external electronic device 610. For example, if an input of pressing the hardware key 612 is detected in a standby mode (e.g., all modes except the call state), the external electronic device 610 may activate a voice recognition function thereof, and may perform voice recognition, based on the voice received through the microphone of the external electronic device 610, thereby executing functions thereof.

According to an embodiment, if a press input onto the hardware key 612 is received in the voice recognition mode during a call, the external electronic device 610 may request the operation of the voice recognition function of the electronic device 620. The external electronic device 610 in the voice recognition mode during a call may transmit, to the electronic device 620, the voice received through the microphone at the same time as the input to the hardware key. In this case, the external electronic device 610 in the call state with the electronic device 620 may recognize that it is in the call state and may perform control so as to prevent the execution of the voice recognition function based on the voice input through the microphone even if an input to the hardware key is performed.

According to various embodiments, although switching to the voice recognition mode during a call may be performed by input to the hardware key 612 of a device (e.g., the external electronic device 620) for remotely controlling another electronic device (e.g., the electronic device 610), the disclosure is not limited thereto, and the switching to the voice recognition mode during a call may also be performed only by simultaneously detecting input signals both in the hardware key 622 of the electronic device 610 and in the hardware key 612 of the external electronic device 620 in the call state.

Figure 7:
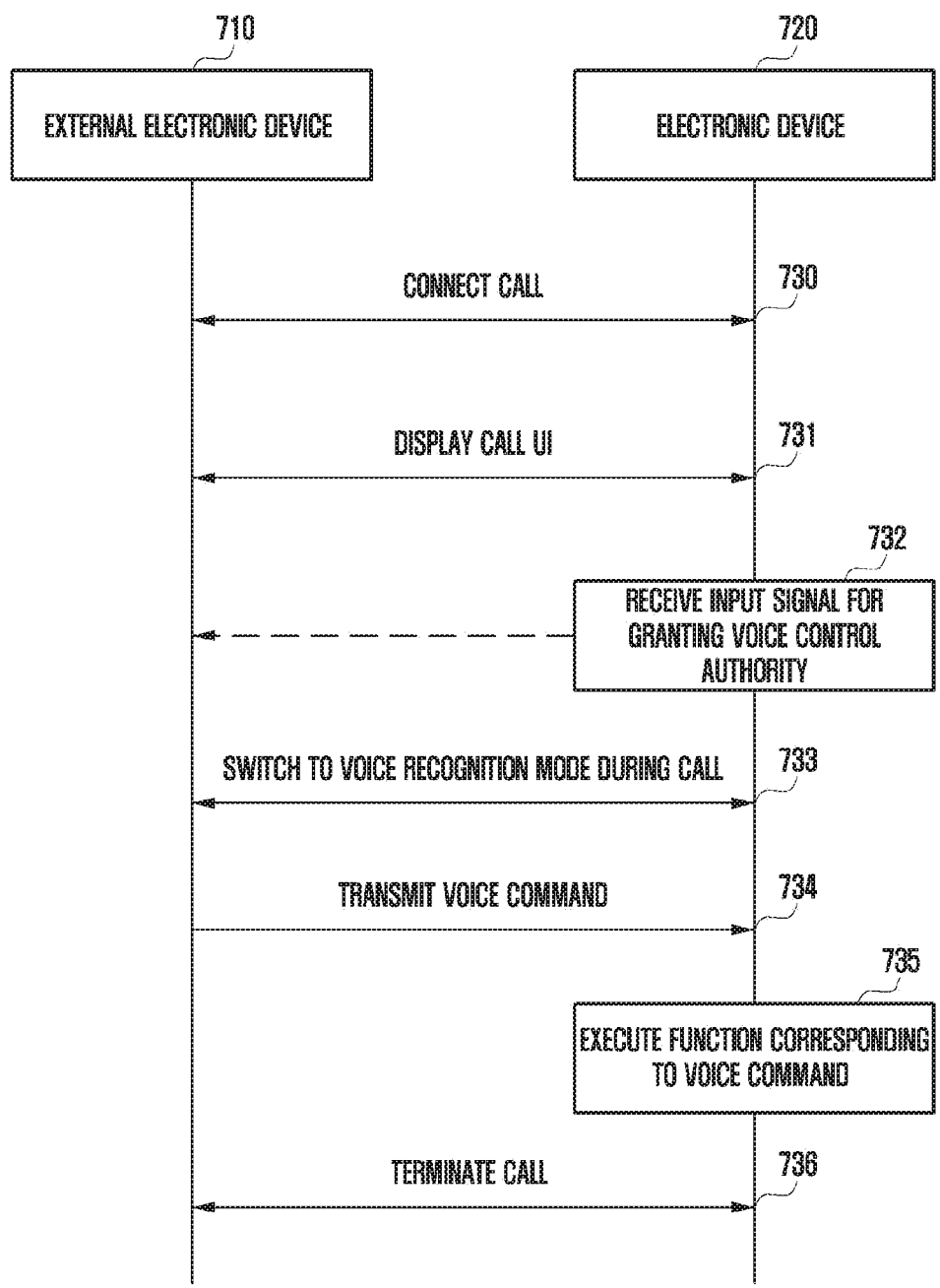
FIG. 7 illustrates a method of executing functions by voice between electronic devices according to an embodiment of the disclosure.
Figure 8:
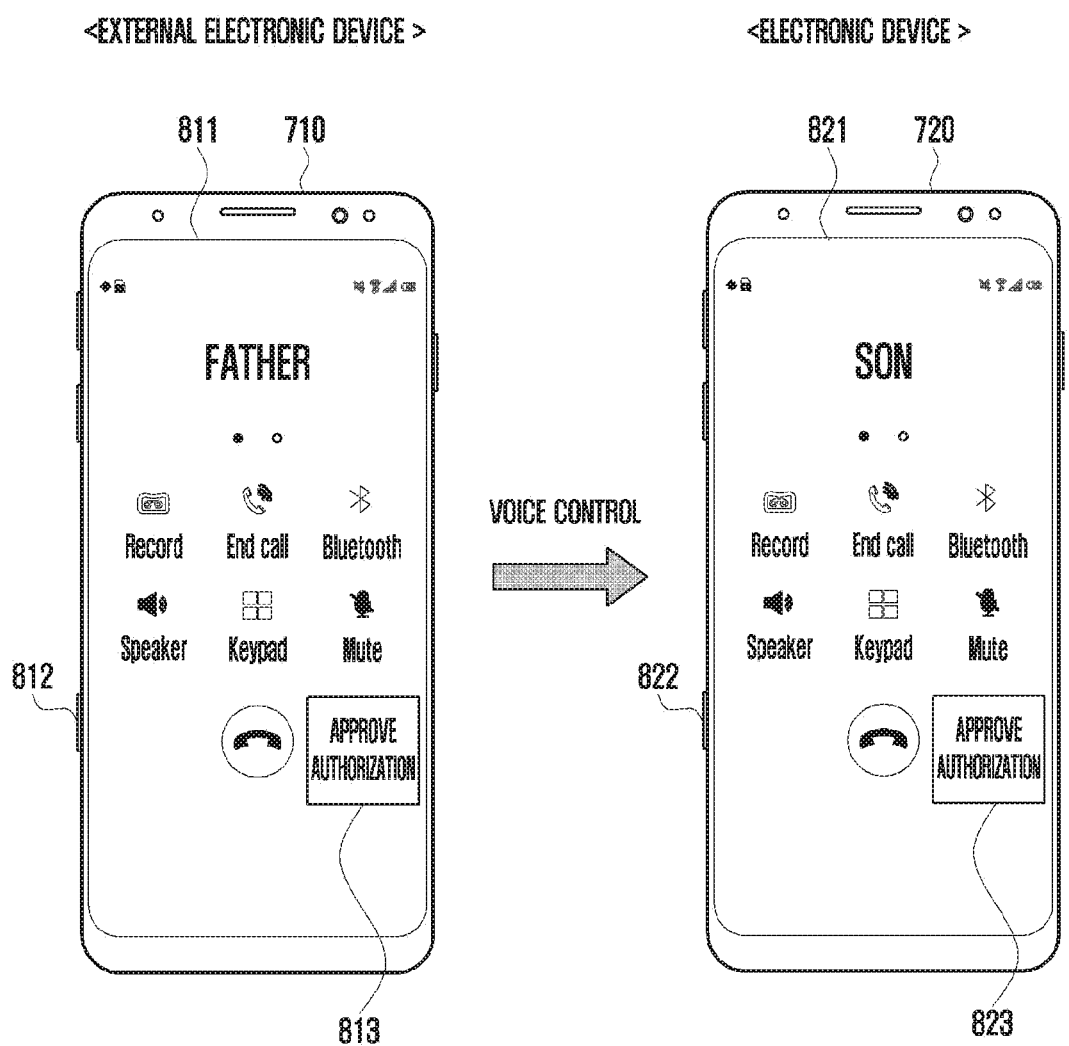
FIG. 8 illustrates the example of executing functions by voice during a call between electronic devices according to an embodiment of the disclosure.

FIG. 7 illustrates a method of executing functions by voice between electronic devices according to an embodiment of the disclosure. FIG. 8 illustrates the example of executing functions by voice during a call between electronic devices according to an embodiment of the disclosure.

Referring to FIGS. 7 and 8, according to various embodiments, an electronic device 720 (e.g., the electronic device 200 in FIG. 2) and an external electronic device 710 (e.g., the electronic device 200 in FIG. 2) may be connection to each other for a call in operation 730.

In operation 731, the electronic device 720 and the external electronic device 710 may display a call graphic user interface (GUI) screen on the display in response to the call connection. For example, as shown in FIG. 8, the external electronic device 710 may display a call GUI screen 811 connected with the electronic device 720 on the display thereof, and the electronic device 720 may display a call GUI screen 821 connected to the external electronic device 710 on the display thereof.

According to various embodiments, the call GUI screens 811 and 821 may further include authorization icons 813 and 823 for remotely granting voice control authority to the external electronic device 710 in the call state. For example, the call GUI screens 811 and 821 may include various icons that support call application functions (e.g., a recording icon, a hang-up icon, a dial pad icon, a speaker mode switch icon, a mute mode icon, a Bluetooth icon, or the like) or authorization icons 813 and 823. If a user wishes to remotely grant voice control authority to an external electronic device in a call connection state, the user may select the authorization icon on the GUI screen 811 or 821.

In operation 732, the electronic device 720 may receive an input signal of selecting the authorization icon 823 on the call GUI screen 821, and may transmit the same to the external electronic device 710.

In operation 733, the electronic device 720 may switch to a voice recognition mode during a call in response to the input signal of selecting its own authorization icon 823, and the external electronic device 710 may switch to a voice recognition mode during a call in response to the reception of the input signal for the authorization icon of the electronic device 720.

In operation 734, the external electronic device 710 may transmit a voice for controlling the electronic device 720 to the electronic device 720 through a call connected communication network. In operation 735, the electronic device 720 may determine a voice command, based on the voice received from the external electronic device 710, and may execute a function of the electronic device 720 corresponding to the voice command. In operation 736, the external electronic device 710 and the electronic device 720 may terminate the call.

Figure 9:
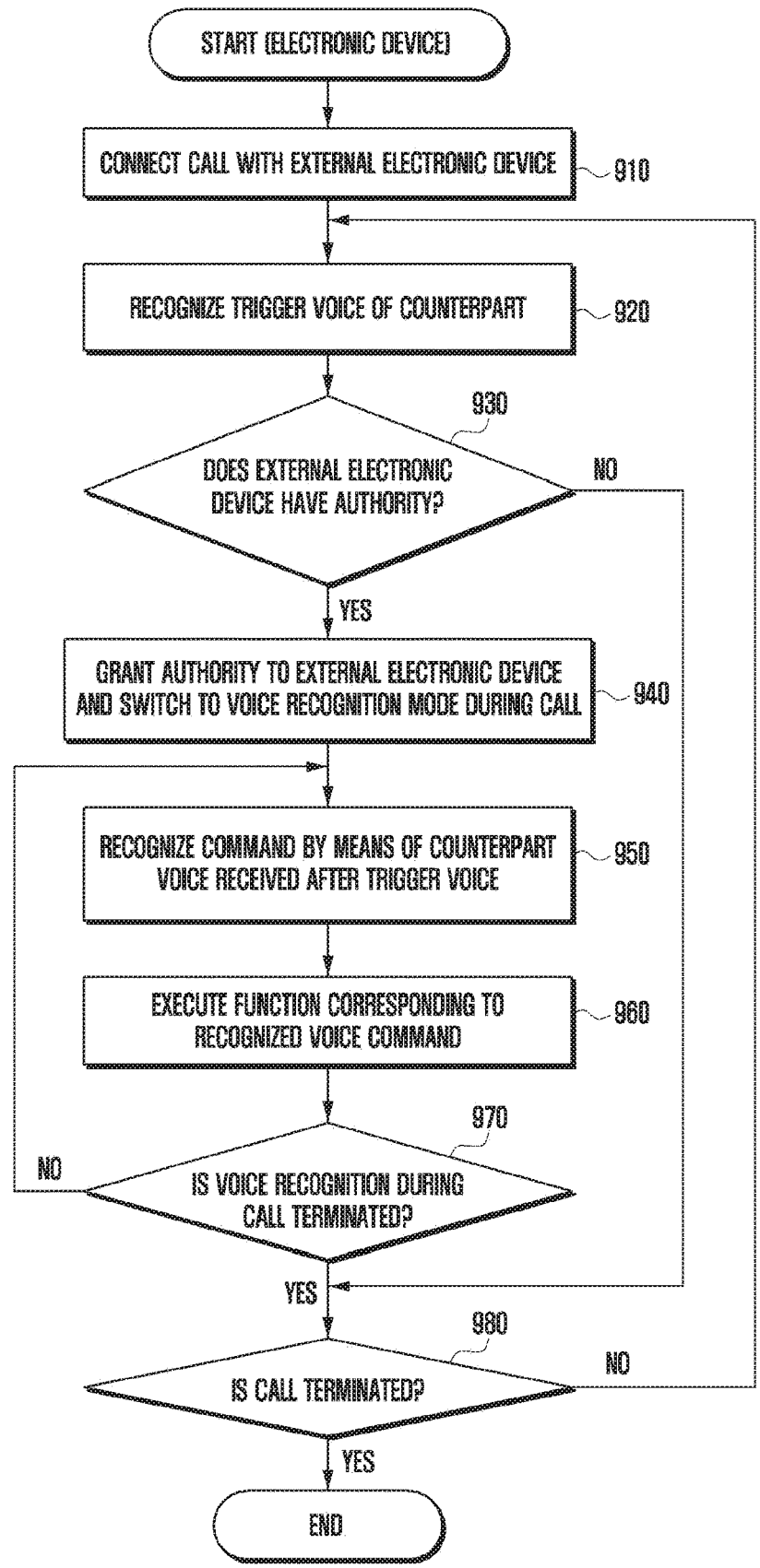
FIG. 9 illustrates a method of executing functions by voice between electronic devices according to an embodiment of the disclosure.

FIG. 9 illustrates a method of executing functions by voice between electronic devices according to an embodiment of the disclosure.

Referring to FIG. 9, according to various embodiments of the disclosure, an electronic device (e.g., the electronic device 200 in FIG. 2) may be connected to an external electronic device (e.g., the electronic device 200 in FIG. 2) for a call through a communication module in operation 910.

In operation 920, the electronic device may detect a speech of a trigger voice among the voice data received from the external electronic device. In operation 930, the electronic device may determine whether or not the call connection external electronic device has voice control authority.

In operation 940, if the external electronic device has voice control authority, the electronic device may grant authority to execute a voice recognition function under the control of the external electronic device, and may switch to a voice recognition mode during a call. For example, the voice recognition mode during a call may be understood as the mode in which the voice recognition function is executed only based on the voice data received through a call communication while blocking the voice recognition by means of the voice data received from a microphone. The external electronic device having the voice control authority may be, for example, a device included in the family group among contact lists stored in the electronic device or a device registered as being capable of giving voice commands during a call.

The electronic device may proceed to step 980 if the external electronic device has no voice control authority.

In operation 950, the electronic device may recognize a voice command, based on the recognition of the voice received the external electronic device, after recognizing the trigger voice.

In operation 960, the electronic device may determine a function execution command corresponding to the recognized voice command, and may execute a function of the electronic device according to the function execution command.

In operation 970, the electronic device may determine whether or not the voice recognition function is terminated during the call, and if the voice recognition function is not terminated during the call, the electronic device may return to operation 950.

According to an embodiment, if a specified time has elapsed since the end point of the voice received after the occurrence of the trigger voice, the electronic device may identify that the voice recognition function of the call is terminated. According to an embodiment, the electronic device may identify that the voice recognition function is terminated according to the completion of the execution of a function of the electronic device based on the voice received from the external electronic device.

If the voice recognition function of the call is terminated in operation 970, the electronic device may proceed to operation 980 to determine whether or not the call is terminated, and if the call is terminated, the electronic device may terminate the process. If the call is not terminated in operation 980, the electronic device may return to step 920 to then wait for another trigger voice to be recognized in the call state, thereby repeating steps 920 to 980.

Figure 10A:
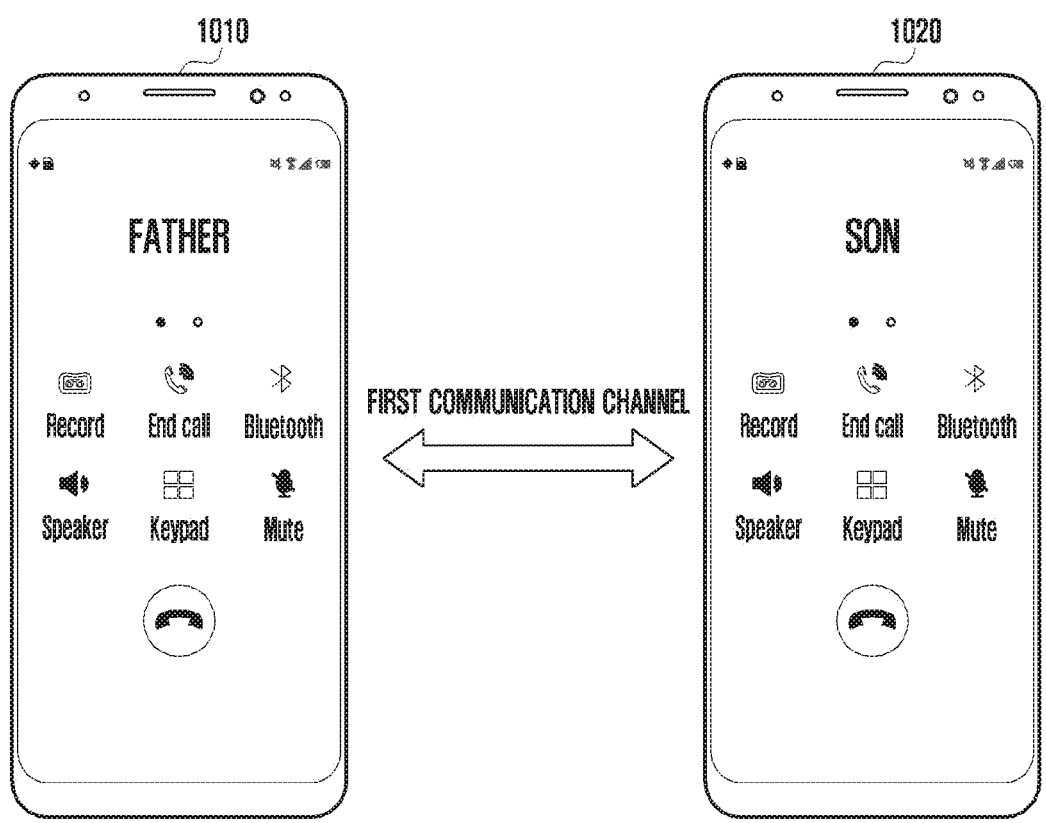
FIGS. 10A and 10B illustrate an example of a communication channel during a call between electronic devices according to an embodiment of the disclosure.
Figure 10B:
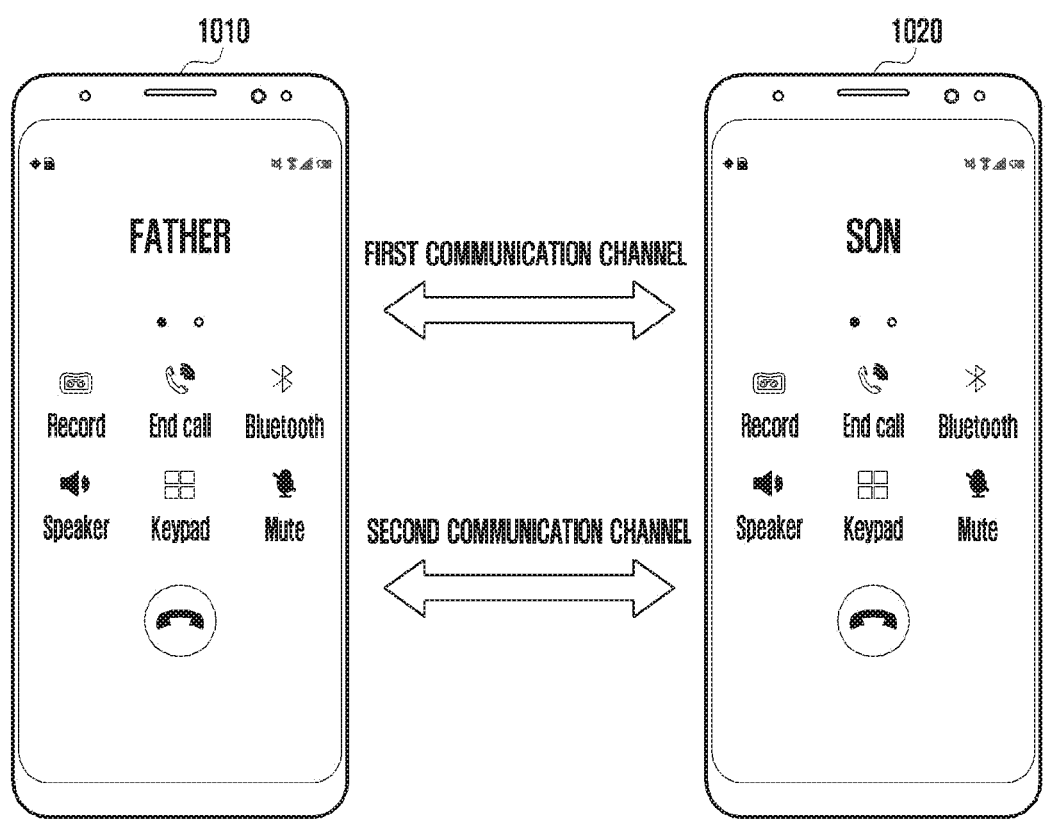

FIGS. 10A and 10B illustrate an example of a communication channel during a call between electronic devices according to an embodiment of the disclosure.

Referring to FIGS. 10A and 10B, according to various embodiments, an electronic device 1020 (e.g., the electronic device 200 in FIG. 2) and an external electronic device 1010 (e.g., the electronic device 200 in FIG. 2) may transmit/receive data for voice recognition during a call using a communication channel for transmitting/receiving voice data in a call state, or may transmit/receive data for voice recognition during a call using a communication channel other than the communication channel for transmitting/receiving voice data in order to support voice recognition mode during a call.

According to an embodiment, as shown in FIG. 10A, the electronic device 1020 and the external electronic device 1010 may transmit/receive voice or video data, and may transmit/receive a trigger key signal for remote voice control and shared screen data resulting from the execution of a function using a first communication channel connected through at least one base station.

According to another embodiment, as shown in FIG. 10B, the electronic device 1020 and the external electronic device 1010 may transmit/receive voice and video data using a first communication channel connected through at least one base station, and may transmit/receive a trigger key signal for remote voice control and shared screen data resulting from the execution of a function using a second communication channel. For example, the first communication channel may be intended to provide voice call services (e.g., CS (circuit switching) network communication), and the second communication channel may be intended to provide data transmission/reception services (e.g., PS (packet switching) network communication), but the communication channel is not limited thereto.

Figure 11:
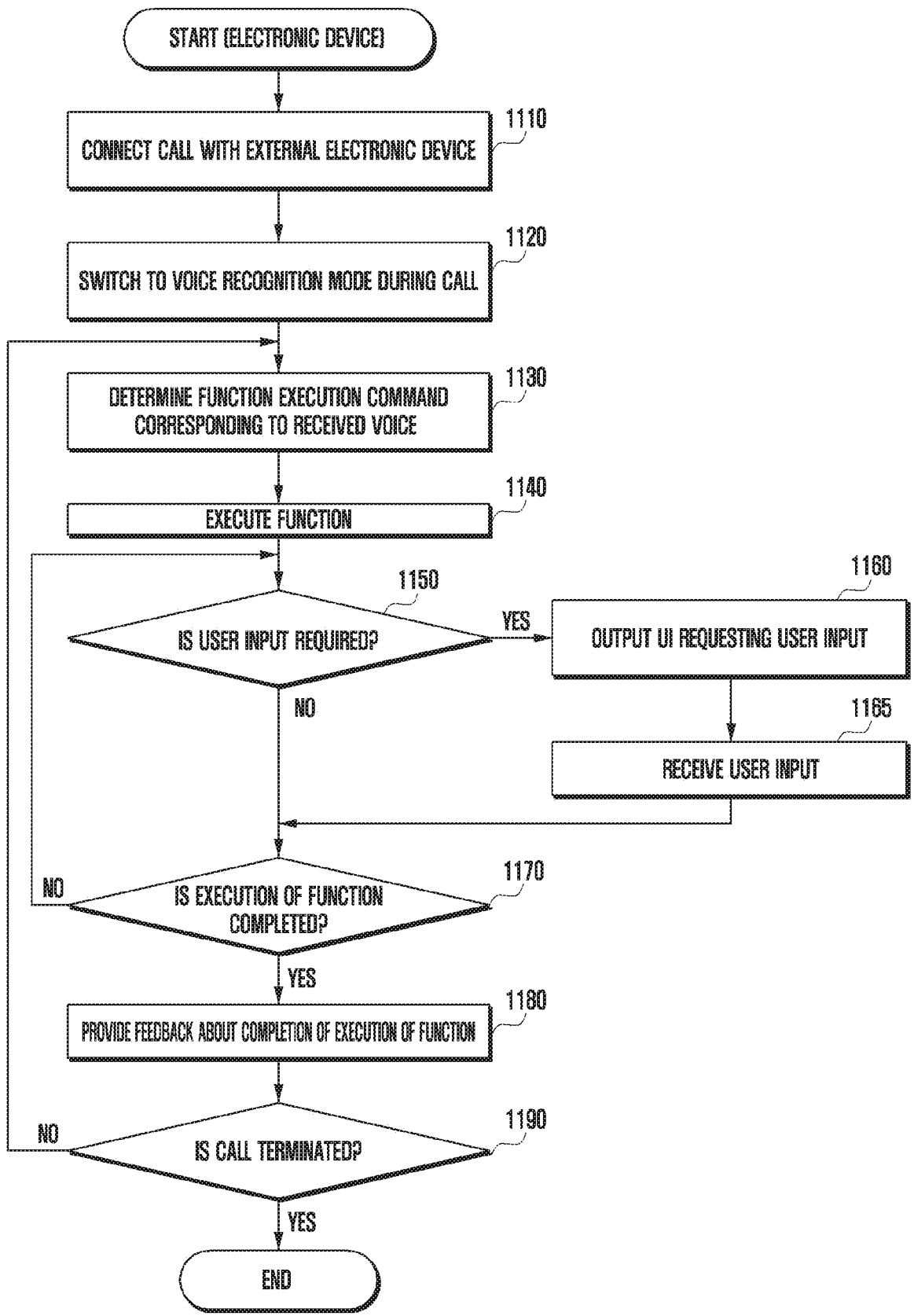
FIG. 11 illustrates a method of executing functions by voice between electronic devices according to an embodiment of the disclosure.

FIG. 11 illustrates a method of executing functions by voice between electronic devices according to an embodiment of the disclosure.

Referring to FIG. 11, according to various embodiments, an electronic device (e.g., the electronic device 200 in FIG. 2) may be connection to an external electronic device (e.g., the electronic device 200 in FIG. 2) for a call through a communication module in operation 1110.

In operation 1120, the electronic device may switch to a voice recognition mode during the call. For example, if a speech of a trigger voice is recognized, or if an input signal of a trigger key is received in the case where the external electronic device has voice control authority, the electronic device may switch to a voice recognition mode during the call.

In operation 1130, the electronic device may perform voice recognition, based on the voice received from the external electronic device, and may determine a function execution command corresponding to the recognized voice of the external electronic device.

In operation 1140, the electronic device may perform a process so as to execute a function according to the determined function execution command.

In operation 1150, the electronic device may determine whether or not a user input is required while executing a function according to the function execution command. For example, the electronic device may determine that a user input is required if an error occurs in the middle of processing the execution of functions in sequence according to the function execution commands, or if an input of selection is required for a specific condition.

In operation 1160, the electronic device may output a UI for requesting a user input during the process of a function.

In operation 1165, the electronic device may receive a user input necessary for the execution of a function. The electronic device may process the function execution command using the received user input, and may proceed to operation 1170. As another example, if no user input is required, the electronic device may perform a function corresponding to the determined function execution command, and may proceed to operation 1170. According to an embodiment, the electronic device may display, on the display, an operation screen corresponding to the function execution operation that is performed based on the voice from the external electronic device. As another example, the electronic device may provide the operation screen corresponding to the function execution operation to the external electronic device to share the same therewith.

In operation 1170, the electronic device may determine whether or not the execution of a function is completed, and if the execution of a function is completed, the electronic device may provide the user with feedback about the completion of the execution of the function. For example, if the execution of a function is completed under the control by a voice from the external electronic device, the electronic device may provide the display with information indicating that the execution of the function is complete, or may output the same by sound. As another example, the electronic device may transmit, to the external electronic device, information indicating that the execution of the function is complete.

In operation 1180, the electronic device may determine whether or not the call ends, and if the call ends, the electronic device may terminate the process. Otherwise, the electronic device may return to operation 1130.

Figure 12:
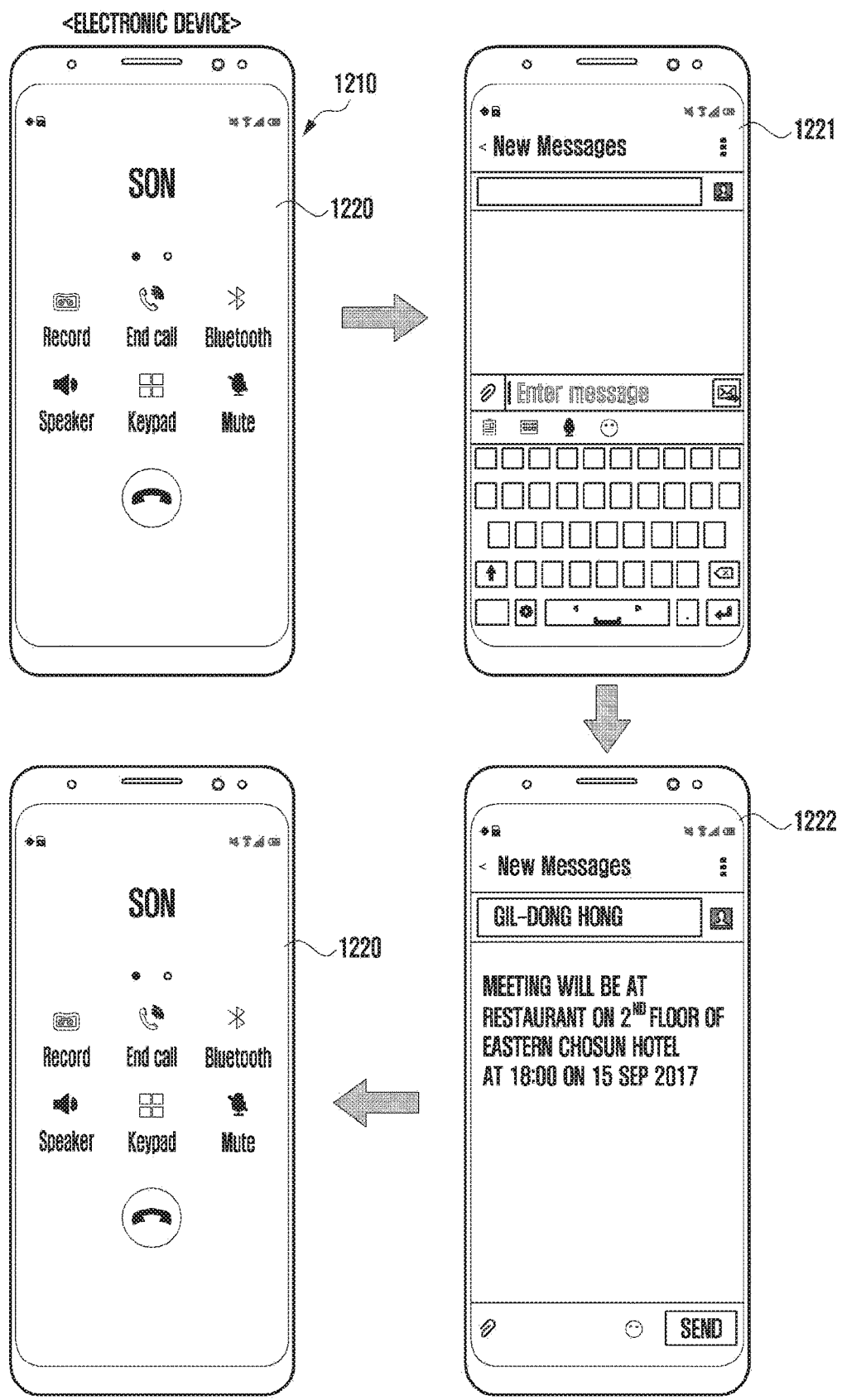
FIG. 12 illustrates an example of executing functions by voice during a call between electronic devices according to an embodiment of the disclosure.

FIG. 12 illustrates an example of executing functions by voice during a call between electronic devices according to an embodiment of the disclosure.

Referring to FIG. 12, according to various embodiments of the disclosure, an electronic device 1210 (e.g., the electronic device 200 in FIG. 2) may execute a voice recognition function under the control of an external electronic device (e.g., the external electronic device 200 in FIG. 2) during a call with the external electronic device. If the electronic device 1210 is connection to the external electronic device for a call, the electronic device may display a call GUI screen 1220 on the display (e.g., the display 220 in FIG. 2). According to an embodiment, the electronic device 1210 may switch to a voice recognition mode during a call, may execute voice commands determined based on the voices received from the external electronic device, may perform operations sequentially in the order of execution of the voice commands, and may display the results on the display. The electronic device 1210 may display a first operation screen 1221 on the display according to the execution of a function, and may then display a second operation screen 1222 subsequent thereto on the display. A plurality of operation screens may be sequentially displayed in the order of operation according to the execution of functions, but the disclosure is not limited thereto. As another example, the electronic device 1210 may display, on the display, only a result of executing the last operation among a plurality of operations. The electronic device 1210, for example, may notify the user that the function is executed while the function is running, and if the execution of a function is completed, the electronic device may return to the call application screen 1220 on the display.

According to various embodiments, if a user input is required in the process of performing a plurality of operations according to the execution of a function, the electronic device 1210 may display a screen requesting a user input on the display, thereby inducing a user input. For example, if a voice command from the external electronic device is to buy a ticket at a specific website, login information for the specific website may be necessary. For example, the electronic device 1210 may switch from the call screen to the login screen of the specific website to thus induce a user input. The user may directly input the parameters required for a plurality of operations through the login screen of the specific website, thereby completing the operation of logging on to the specific website. The electronic device 1210 may complete the execution of a function, based on the user input, and may notify the user or the external electronic device of the completion of the execution of a function.

Figure 13:
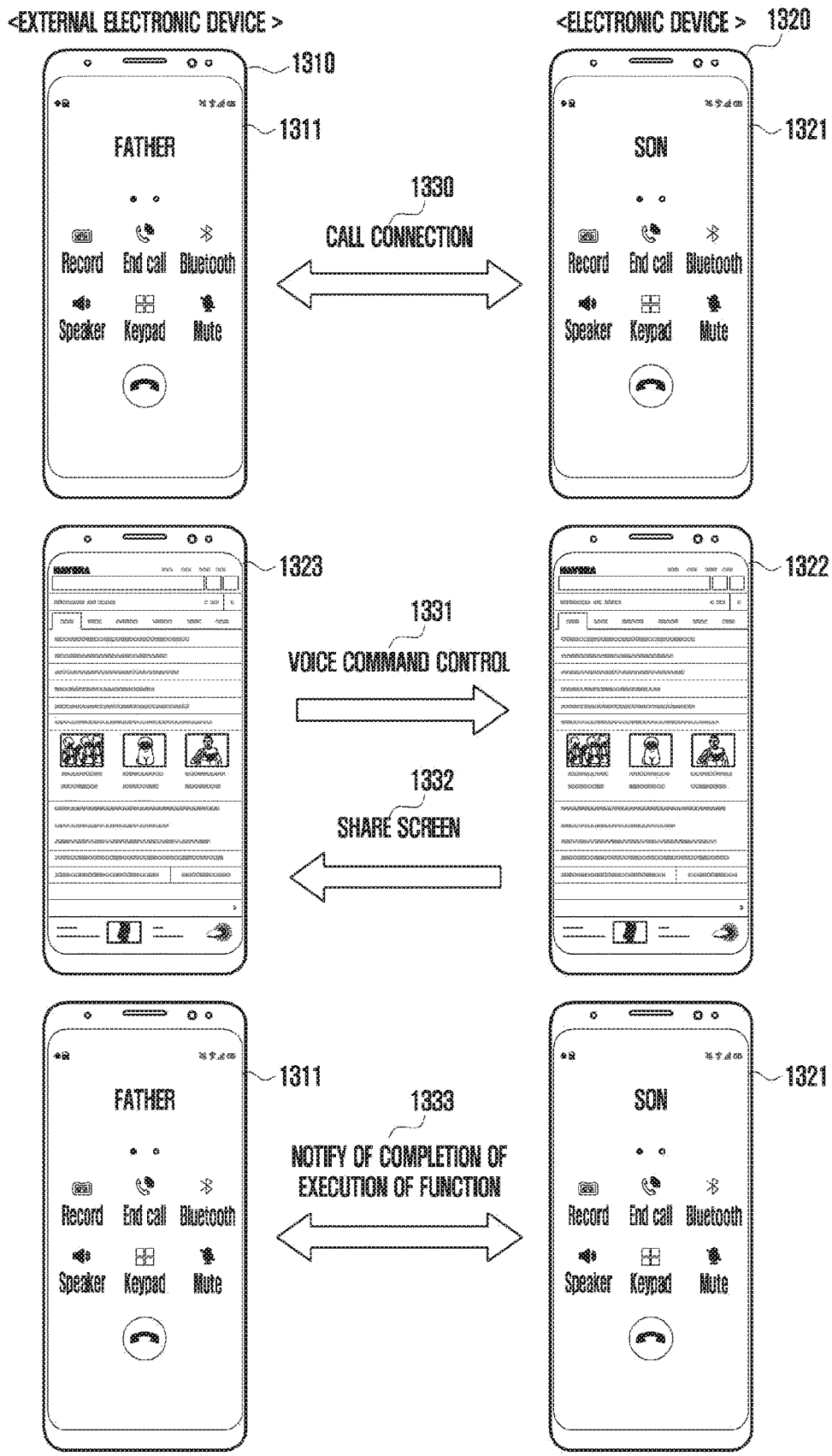
FIG. 13 illustrates an example of executing functions by voice during a call between electronic devices according to an embodiment of the disclosure.

FIG. 13 illustrates an example of executing functions by voice during a call between electronic devices according to an embodiment of the disclosure.

Referring to FIG. 13, according to various embodiments, an electronic device 1320 (e.g., the electronic device 200 in FIG. 2) may transmit, to an external electronic device 1310, a function execution screen based on the voice received from the external electronic device 1310, and may share the same with the external electronic device 1310, thereby sending feedback indicating that the function is being executed in the electronic device 1320 to the user of the external electronic device. In operation 1330, the external electronic device 1310 and the electronic device 1320 may display call GUI screens 1311 and 1321 on displays (e.g., the display 220 in FIG. 2), respectively, in a call connection state.

For example, if the electronic device 1320 recognizes a speech of a trigger voice, or if an input signal of a trigger key is received in the case where the external electronic device 1310 has voice control authority, the electronic device 1320 may switch to a voice recognition mode during a call. As another example, the external electronic device 1310 may switch to a voice recognition mode during a call.

In operation 1331, the external electronic device 1310 may transmit a voice command to control the electronic device 1320 through a communication channel using a communication network. The electronic device 1320 may perform voice recognition, based on the voice command received from the external electronic device 1312, and may execute a function of the electronic device corresponding to the recognized voice command.

In operation 1332, the electronic device 1320 may display an operation screen 1322 performed according to the function execution command on the display. For example, the electronic device 1320 may transmit operation screen information to the external electronic device 1310 in order to share the operation screen 1322 displayed in the electronic device with the external electronic device 1310. The external electronic device 1310, for example, may output the operation screen 1323 received from the electronic device 1320 in the call state to at least a portion of the display.

According to various embodiments, if a user input is required in the process of performing a plurality of operations according to the execution of a function, the electronic device 1320 may display a screen requesting a user input on the display, thereby inducing a user input. As another example, the electronic device 1320 may share a screen requesting a user input with the external electronic device 1310, and may receive parameter information from the external electronic device, thereby completing the execution of a function.

In operation 1333, if the execution of a function is completed in the electronic device 1320, the electronic device 1320 may transmit information indicating the completion of the execution of the function to the external electronic device 1310, and the display may output a call GUI screen 1321 to notify the user that the execution of the function is complete. The external electronic device 1310 may display, on the display 310, a call GUI screen 1311 according to the completion of the execution of a function in the electronic device.

Although not shown in the drawings, according to various embodiments, when the execution of a function is complete, the electronic device and the external electronic device may output notification information such as "Execution of function is completed" in a pop-up window, or may output a notification sound through a speaker in addition to returning to the call GUI screen.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication module;
a display;
a memory; and
a processor electrically connected to the communication module, the display, and the memory,
wherein the memory stores instructions that cause, when executed, the processor to:
receive a voice recognition trigger command during a call while a call connection with an external electronic device is maintained;
activate a voice recognition function, based on the voice recognition trigger command;
execute the voice recognition function, based on a voice received from the external electronic device;
determine a function execution command corresponding to a recognized voice; and
execute a function of the electronic device according to the determined function execution command, and
wherein the instructions cause the processor to switch to a voice recognition mode during a call in which the voice recognition function is executed by means of voice data received from the external electronic device through a call connection channel while ignoring voice data received from a microphone in a case where the voice recognition function during a call is activated.

2. The electronic device of claim 1, wherein the instructions further cause the processor to:
if a trigger key signal to activate the voice recognition function is received through the communication module from the external electronic device, recognize the trigger key signal as the voice recognition trigger command, thereby activating the voice recognition function; and
execute the voice recognition function by means of a voice received from the external electronic device while the reception of the trigger key signal from the external electronic device is maintained.

3. The electronic device of claim 1, wherein the instructions further cause the processor to:
if a trigger key signal to activate the voice recognition function is received from the external electronic device, recognize the trigger key signal as the voice recognition trigger command, thereby activating the voice recognition function;
execute the voice recognition function, based on a voice received from the external electronic device, after receiving the trigger key signal; and
if the trigger key signal is received again, terminate the voice recognition mode during a call.

4. The electronic device of claim 2, wherein the instructions further cause the processor to:
determine whether or not the external electronic device has voice control authority;
if the external electronic device has voice control authority, activate the voice recognition function; and
if the external electronic device has no voice control authority, not activate the voice recognition function.

5. The electronic device of claim 1, wherein the instructions further cause the processor to:
display, on the display, a call screen comprising an authorization icon for remotely grating voice control authority to the external electronic device when a call is connected; and
if an input for selecting the authorization icon is received through the call screen, grant the voice control authority to the external electronic device, thereby activating the voice recognition function and switching to the voice recognition mode during a call.

6. The electronic device of claim 1, wherein the instructions further cause the processor to:
connect a call in a state in which the voice recognition function is activated;
monitor the voice received from the external electronic device, thereby recognizing a speech time of the voice corresponding to a trigger command;
if the speech time is recognized, determine whether or not the external electronic device has voice control authority; and
if the external electronic device has voice control authority, execute a voice recognition function by means of a voice received from the external electronic device after the speech time.

7. The electronic device of claim 1, wherein the instructions further cause the processor to:
determine whether or not the external electronic device has voice control authority if the call is connected; and
if the external electronic device has voice control authority, activate the voice recognition function and switch to the voice recognition mode during a call.

8. The electronic device of claim 6, wherein the external electronic device having the voice control authority is a device included in a family group among contact lists stored in the electronic device or a device registered as being capable of voice control during a call.

9. The electronic device of claim 1, wherein the instructions further cause the processor to display, on the display, an operation screen corresponding to an operation of executing the voice recognition function of the elctronic device.

10. The electronic device of claim 1, wherein the instructions further cause the processor to:
display, on the display, a user interface for a user input required when the voice recognition function of the electronic device is executed; and
execute the function of the electronic device, based on the user input.

11. The electronic device of claim 9, wherein the instructions further cause the processor to transmit information on the operation screen displayed on the display to the external electronic device.

12. The electronic device of claim 9, wherein the instructions further cause the processor to control the communication module so as to transmit and receive voice data to and from the external electronic device through a first communication channel and so as to transmit and receive at least one of a trigger key input-signal or operation screen information to and from the external electronic device through a second communication channel.

13. The electronic device of claim 9, wherein the instructions further cause the processor to provide the external electronic device with feedback information indicating that the execution of the voice recognition function of the electronic device is completed in the case where the execution of the voice recognition function of the electronic device is completed in response to the voice received from the external electronic device.

14. A method of controlling functions by a voice received from an external electronic device in an electronic device, the method comprising:
receiving a voice recognition trigger command during a call while a call connection with an external electronic device is maintained;
executing a voice recognition function by means of a voice received from the external electronic device after the voice recognition trigger command;
determining a function execution command corresponding to a recognized voice; and
executing a function of the electronic device during the call according to the determined function execution command, and
wherein executing the voice recognition function by means of the voice received from the external electronic device comprises executing the voice recognition function by means of voice data received through a communication connection channel while ignoring the voice data received from a microphone in response to the reception of the voice recognition trigger command during the call.

15. The method of claim 14, wherein receiving the voice recognition trigger command during the call comprises receiving at least one of a speech of a trigger voice received from the external electronic device having voice control authority, a trigger key signal to trigger the voice recognition function, which is received from the external electronic device through a communication module, and an input signal of selecting an authorization icon for granting voice control authority during the call in the electronic device.

16. The method of claim 14, wherein executing the voice recognition function by means of the voice received from the external electronic device comprises performing voice recognition, based on a voice received from the external electronic device, while the reception of a trigger key signal to trigger the voice recognition function from the external electronic device is maintained.

17. The method of claim 14, further comprising executing the voice recognition function only based on the voice from the external electronic device comprising activating the voice recognition function by recognizing a trigger key signal to trigger the voice recognition function received from the external electronic device as the voice recognition trigger command, executing the voice recognition function, based on a voice received from the external electronic device, after receiving the trigger key signal; and if the trigger key signal is received again, terminating the voice recognition mode during the call.

18. The method of claim 14, wherein receiving the voice recognition trigger command during the call comprises:
  determining whether or not the external electronic device has voice control authority;
  if the external electronic device has voice control authority, performing voice recognition, based on a voice received from the external electronic device; and
  if the external electronic device has no voice control authority, performing the voice recognition, based on a voice collected through a microphone of the electronic device.

* * * * *